United States Patent
Ha et al.

(10) Patent No.: US 10,459,316 B2
(45) Date of Patent: Oct. 29, 2019

(54) CAMERA APPARATUS FOR VEHICLE

(71) Applicant: HYUNDAI AUTRON CO., LTD., Seongnam-si (KR)

(72) Inventors: Chang Woo Ha, Seoul (KR); Jun Muk Lee, Seongnam-si (KR); Ho Joon Kim, Seoul (KR); Byung Jik Keum, Seoul (KR)

(73) Assignee: Hyundai Autron Co., Ltd., Seoul (KR)

( * ) Notice: Subject to any disclaimer, the term of this patent is extended or adjusted under 35 U.S.C. 154(b) by 0 days.

(21) Appl. No.: 16/048,198

(22) Filed: Jul. 27, 2018

(65) Prior Publication Data

US 2019/0033689 A1    Jan. 31, 2019

(30) Foreign Application Priority Data

Jul. 28, 2017    (KR) .................. 10-2017-0096516

(51) Int. Cl.
| | | |
|---|---|---|
| G03B 17/02 | (2006.01) | |
| B60R 11/04 | (2006.01) | |
| H04N 5/225 | (2006.01) | |
| B60R 11/00 | (2006.01) | |

(52) U.S. Cl.
CPC .............. *G03B 17/02* (2013.01); *B60R 11/04* (2013.01); *H04N 5/2252* (2013.01); *B60R 2011/0026* (2013.01)

(58) Field of Classification Search
None
See application file for complete search history.

(56) References Cited

U.S. PATENT DOCUMENTS

| | | | |
|---|---|---|---|
| 9,871,971 B2 * | 1/2018 | Wang ..................... | H04N 7/183 |
| 2015/0124150 A1 * | 5/2015 | Hibino .................... | B60R 11/04 |
| | | | 348/335 |
| 2016/0023620 A1 * | 1/2016 | Matori .................... | B60R 11/04 |
| | | | 348/148 |
| 2016/0119520 A1 * | 4/2016 | Park ..................... | H04M 1/0264 |
| | | | 348/373 |
| 2017/0372176 A1 * | 12/2017 | Hibino ............... | G06K 9/00798 |
| 2018/0069993 A1 * | 3/2018 | Hart ...................... | H04N 5/2252 |
| 2018/0069994 A1 * | 3/2018 | Nakamura ........... | H04N 5/2257 |
| 2018/0288291 A1 * | 10/2018 | Shimizu ............... | H04N 5/2253 |
| 2019/0033689 A1 * | 1/2019 | Ha ........................ | G03B 17/02 |

FOREIGN PATENT DOCUMENTS

| | | |
|---|---|---|
| KR | 10-2002-0037264 A | 2/2006 |
| KR | 10-2007-0023243 A | 2/2007 |
| WO | 2014141357 A1 | 9/2014 |

* cited by examiner

*Primary Examiner* — William B Perkey
(74) *Attorney, Agent, or Firm* — Baker & Hostetler LLP; Hyunho Park

(57) ABSTRACT

Provided is a camera apparatus for a vehicle, including a housing having a recess formed therein. The housing may include: a main wall part having a camera hole formed therein; a base part extended from the main wall part and having a downward slope in which a distance from the center axis of the camera hole to the base part increases toward the end of the base part from the main wall part; and a sidewall part adjacent to the main wall part and extended upward from the base part, the main wall part, the base part and the sidewall part form the recess in the housing, and a light trap part for trapping light reflected from the base part and the sidewall part into the camera hole is installed on the base part and the sidewall part.

8 Claims, 13 Drawing Sheets

CAMERA APPARATUS FOR VEHICLE

CROSS-REFERENCES TO RELATED APPLICATIONS

The present application claims priority to Korean application number 10-2017-0096516, filed on Jul. 28, 2017, which is incorporated by reference in its entirety.

BACKGROUND OF THE INVENTION

1. Technical Field

The present invention relates to a camera apparatus for a vehicle, and more particularly, to a camera apparatus for a vehicle, which can prevent optical reflection to reduce light incident on a camera module mounted in the vehicle.

2. Related Art

As a driving assist system which assists a driver by providing an image around a vehicle to the driver, various systems may be mounted in a vehicle. The systems may include an around view monitoring (AVM) system, a lane keeping assist system (LKAS), a lane departure warning system (LDWS), an adaptive front-lighting system (AFLS) and the like. In order to implement such systems, a front view camera for filming the area ahead of the vehicle is mounted on the vehicle.

Since the quality of an image acquired by the front view camera is directly connected to the operation performance of the above-described driving assist system, the high quality of the image acquired by the front view camera must be guaranteed in order to secure the driving stability of the vehicle. In particular, light incident on a camera lens through diffuse reflection by the mechanical structure of the front view camera may cause a problem such as glare or blur on the image acquired by the front view camera. Such a phenomenon may deepen when backlight is incident on the front view camera.

In order to remove the light incident on the camera lens through diffuse reflection, precise optical design for the mechanical structure of the camera apparatus is required. However, the optical design of the camera apparatus may require a lot of cost and time. Furthermore, if a slightly different design value is applied, a large amount of diffuse reflected light may be incident on the camera lens. Furthermore, since different optical designs are required depending on the field of view (FOV) of the camera lens or the mechanical structure of the camera apparatus, the efficiency may be degraded in terms of cost, time and workability.

The related art of the present invention is disclosed in Korean Patent Publication No. 10-2007-0023243 published on Aug. 24, 2007.

BRIEF SUMMARY

Embodiments of the present invention are directed to a camera apparatus for a vehicle, which can effectively reduce light incident on a camera lens through diffuse reflection without relying on the type of a camera sensor, the FOV of the lens or the mechanical structure of the camera apparatus, thereby securing the quality of an image acquired by a front view camera while removing inefficiency accompanied during the conventional optical design.

In one embodiment, there is provided a camera apparatus for a vehicle, including a housing having a recess formed therein. The housing may include: a main wall part having a camera hole formed therein; a base part extended from the main wall part and having a downward slope in which a distance from the center axis of the camera hole to the base part increases toward the end of the base part from the main wall part; and a sidewall part adjacent to the main wall part and extended upward from the base part, the main wall part, the base part and the sidewall part form the recess in the housing, and a light trap part for trapping light reflected from the base part and the sidewall part into the camera hole is installed on the base part and the sidewall part.

A camera module including an image recognition sensor, a lens and a camera housing may be installed in the camera hole, and the camera module may concentrate light of an image around the vehicle through the lens, and recognize the concentrated light of the vehicle around image through the image recognition sensor, in order to take the vehicle around image.

The light trap part may include a fiber member brought in contact with the outer surfaces of the base part and the sidewall part so as to absorb light incident from the base part and the sidewall part.

The light trap part may further include a coupling member formed at contact surfaces with the outer surfaces of the base part and the sidewall part so as to be attached to/detached form the outer surfaces of the base part and the sidewall part.

The housing may be installed on the inner surface of the windshield of the vehicle, and the light trap part may be formed on the top outer surface of the housing, adjacent to the sidewall part, and thus absorb light incident through a gap between the windshield and the top outer surface of the housing, adjacent to the sidewall part.

The light trap part may be formed on a groove part formed at the top outer surface of the housing, adjacent to the sidewall part.

The height of the groove part may be adjusted so that a height difference between the light trap part formed on the groove part and the top outer surface of the housing falls within a preset error range.

The distance between the camera hole and the light trap part brought in contact with the outer surfaces of the base part may be adjusted so as to prevent an occurrence of interference in the FOV of the camera module.

The downward slope of the base part and the thickness of the light trap part brought in contact with the outer surfaces of the base part may be adjusted so as to prevent an occurrence of interference in the FOV of the camera module.

DETAILED DESCRIPTION

Hereafter, a camera apparatus for a vehicle in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
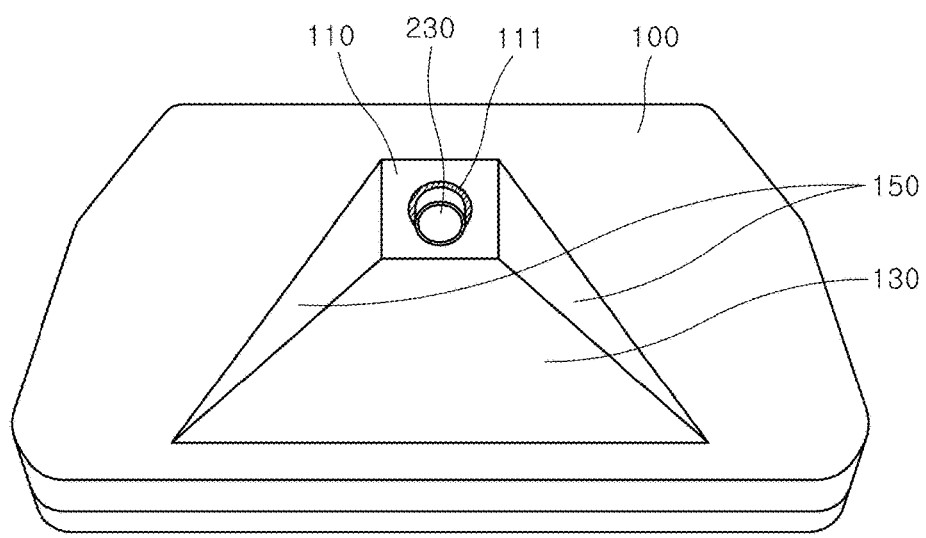
FIG. 1 is a perspective view illustrating the structure of a camera apparatus for a vehicle in accordance with an embodiment of the present invention.
Figure 2:
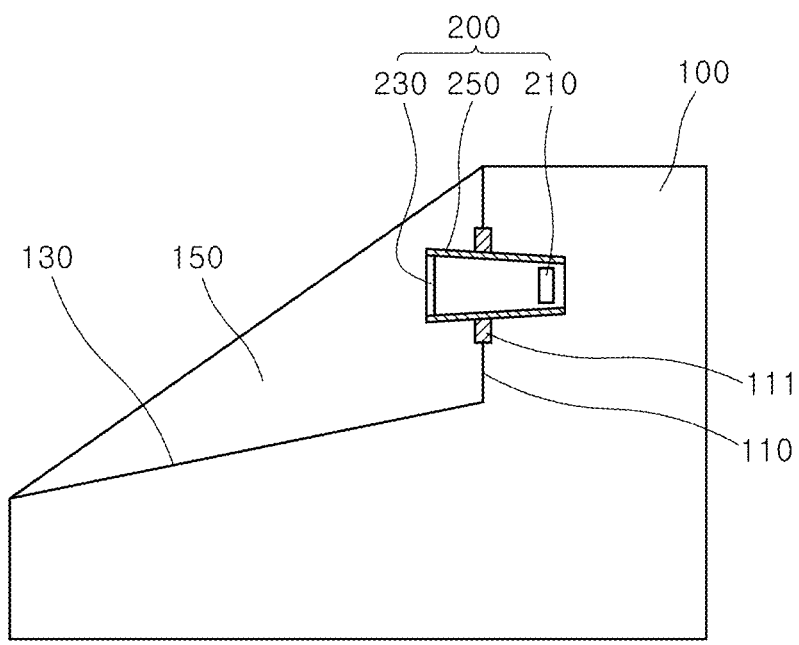
FIG. 2 is a side view illustrating the structure of the camera apparatus for a vehicle in accordance with the embodiment of the present invention.
Figure 3:
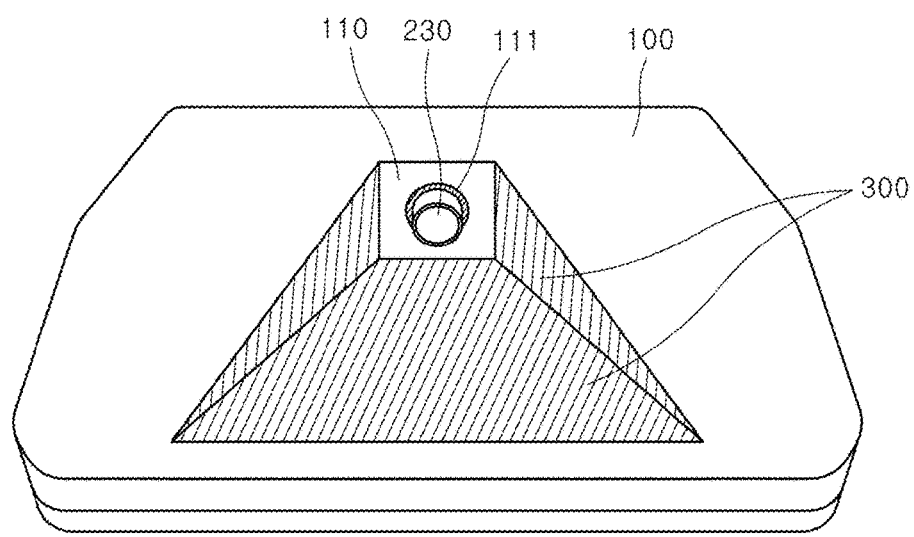
FIG. 3 is a perspective view illustrating the camera apparatus for a vehicle in accordance with the embodiment of the present invention.
Figure 4:
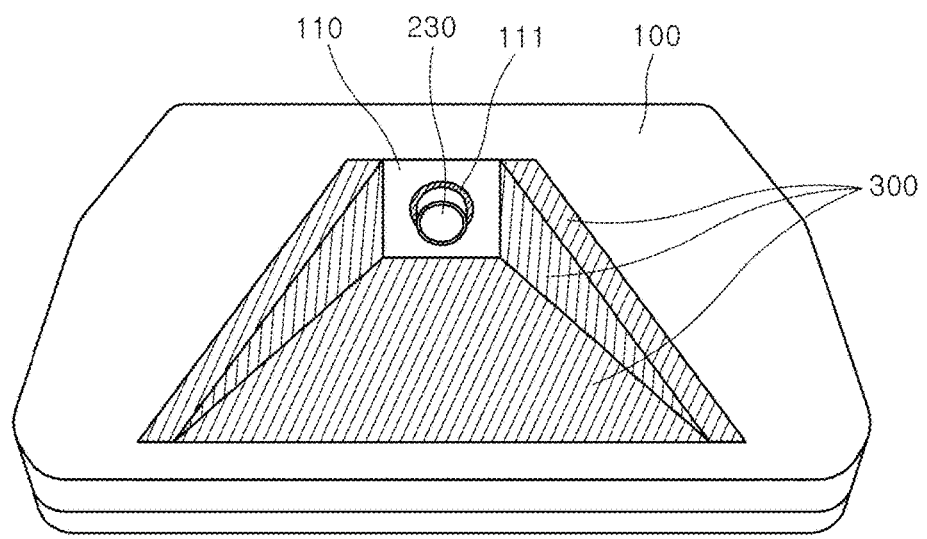
FIG. 4 is a perspective view illustrating a structure in which a light trap part is formed on the top outer surface of a housing, adjacent to a sidewall part, in the camera apparatus for a vehicle in accordance with the embodiment of the present invention.
Figure 5:
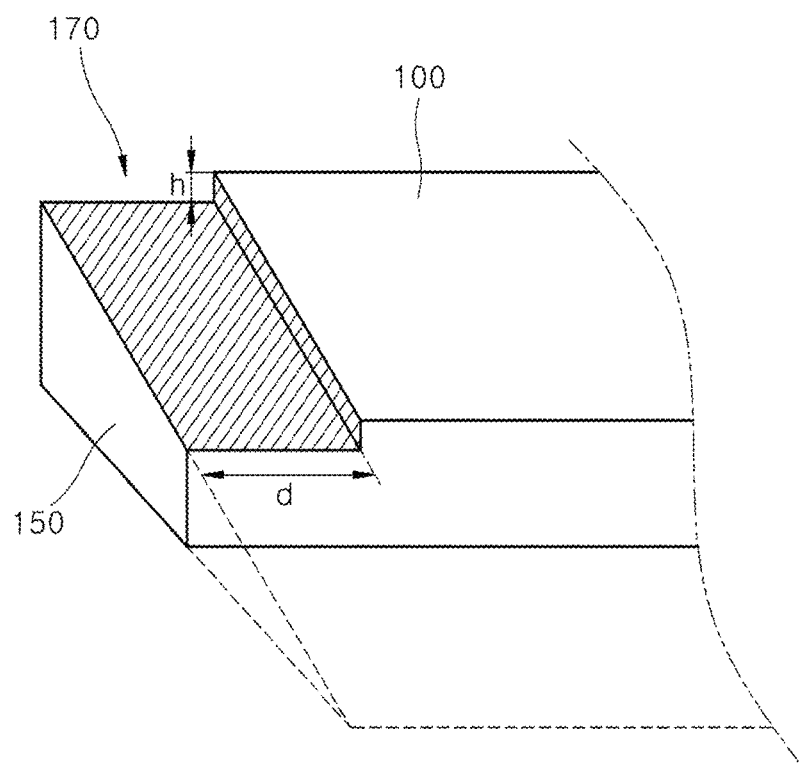
FIG. 5 is a partial cross-sectional view illustrating a groove part formed in the housing in the camera apparatus for a vehicle in accordance with the embodiment of the present invention.
Figure 6:
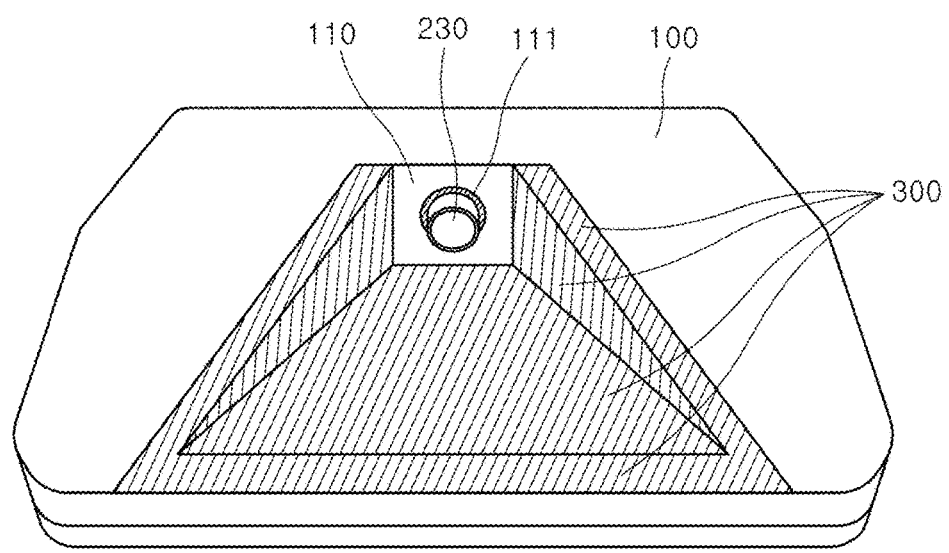
FIG. 6 is a perspective view illustrating a structure in which the light trap part is formed on the top outer surface of the housing, adjacent to a base part, in the camera apparatus for a vehicle in accordance with the embodiment of the present invention.
Figure 7:
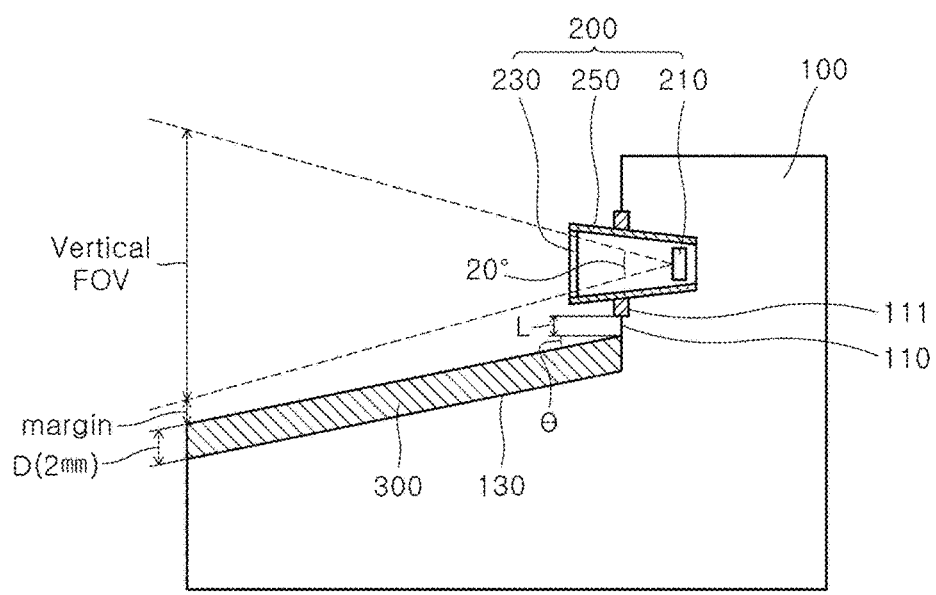
FIG. 7 is a side cross-sectional view illustrating a condition that no interference occurs in the field of view (FOV) of a camera module in the camera apparatus for a vehicle in accordance with the embodiment of the present invention.
Figure 8A:
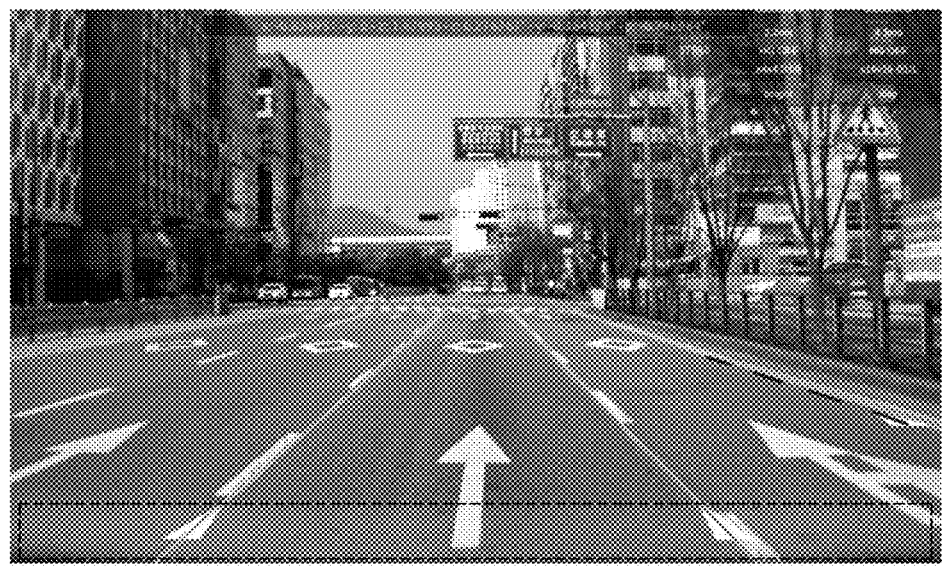
FIGS. 8A to 8D are photographs showing problems caused by light incident on the camera module through diffuse reflection.
Figure 8B:
Figure 8C:
Figure 8D:
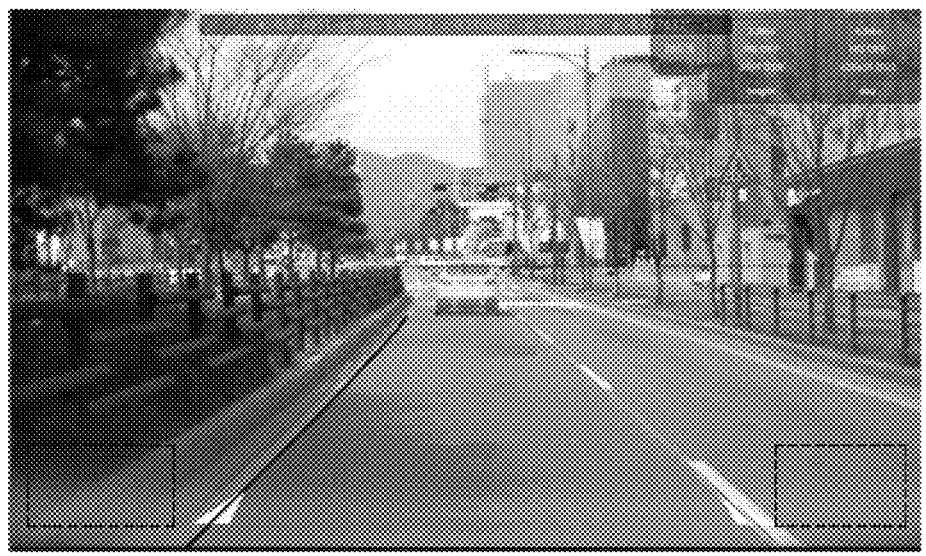
Figure 9A:
FIGS. 9A and 9B are photographs showing results obtained by removing the problems caused by diffuse reflection through the light trap part.
Figure 9B:

FIG. 1 is a perspective view illustrating the structure of a camera apparatus for a vehicle in accordance with an embodiment of the present invention, FIG. 2 is a side view illustrating the structure of the camera apparatus for a vehicle in accordance with the embodiment of the present invention, FIG. 3 is a perspective view illustrating the camera apparatus for a vehicle in accordance with the embodiment of the present invention, FIG. 4 is a perspective view illustrating a structure in which a light trap part is formed on the top outer surface of a housing, adjacent to a sidewall part, in the camera apparatus for a vehicle in accordance with the embodiment of the present invention, FIG. 5 is a partial cross-sectional view illustrating a groove part formed in the housing in the camera apparatus for a vehicle in accordance with the embodiment of the present invention, FIG. 6 is a perspective view illustrating a structure in which the light trap part is formed on the top outer surface of the housing, adjacent to a base part, in the camera apparatus for a vehicle in accordance with the embodiment of the present invention, FIG. 7 is a side cross-sectional view illustrating a condition that no interference occurs in the field of view (FOV) of a camera module in the camera apparatus for a vehicle in accordance with the embodiment of the present invention, FIGS. 8A to 8D are photographs showing problems caused by light incident on the camera module through diffuse reflection, and FIGS. 9A and 9B are photographs showing results obtained by removing the problems caused by diffuse reflection through the light trap part.

Referring to FIGS. 1 and 2, the structure of the camera apparatus for a vehicle in accordance with the embodiment of the present invention will be described. A housing 100 may form a case of the camera apparatus for a vehicle in accordance with the embodiment of the present invention, and the top of the housing 100 may have a predetermined slope in consideration of the slope of the windshield (not illustrated) of the vehicle, such that the housing 100 can be easily mounted on the windshield.

The housing 100 may include a main wall part 110 having a camera hole 111 in which a camera module 200 is installed, and the camera module 200 may include an image recognition sensor 210, a lens 230 and a camera housing 250. As illustrated in FIG. 2, the image recognition sensor 210 may be implemented with a predetermined image sensor (for example, CMOS image sensor) and installed in the housing 100, and the lens 230 may be installed outside the housing 100 and connected to the image recognition sensor 210 through the camera housing 250. The camera module 200 may be installed in the camera hole 111 and thus housed in the housing 100. The camera module 200 may concentrate light of an image around the vehicle through the lens 230, and recognize the concentrated light of the vehicle around image through the image recognition sensor 210, in order to take the vehicle around image.

The housing 100 may include a base part 130 and a sidewall part 150. The base part 130 may be extended from the main wall part 110 while having a downward slope in which the distance from the central axis of the camera hole 111 from the base part 130 increases toward the end of the base part 130 from the main wall part 110, the central axis indicating the optical axis of the camera module 200. The sidewall part 150 may be adjacent to the main wall part 110 and extended upward from the base part 130. Therefore, as illustrated in FIG. 1, the main wall part 110, the base part 130 and the sidewall part 150 may form a recess in the housing 100. The recess may be formed at the top of the housing 100 as a pocket structure for securing the FOV of the camera module 200 installed in the camera hole 111. When the camera apparatus for a vehicle in accordance with the present embodiment is coupled to the windshield of the vehicle, the recess may correspond to a space formed by the windshield of the vehicle, the main wall part 110, the base part 130 and the sidewall part 150. As the recess is formed at the top of the housing 100, the camera module 200 can film the area around the vehicle without FOV interference by the housing 100.

The base part 130 and the sidewall part 150 in accordance with the present embodiment may be formed with a protrusion structure for trapping light reflected into the camera hole 111 from the base part 130 and the sidewall part 150. The reflected light may indicate light incident which is reflected by the base part 130 and the sidewall part 150 and incident on the lens 230 of the camera module 200. That is, since the outer surfaces of the base part 130 and the sidewall part 150 have the protrusion structure, light incident on the base part 130 and the sidewall part 150 can be trapped.

As illustrated in FIG. 3, the camera apparatus for a vehicle in accordance with the present embodiment may further include a light trap part 300 installed on the base part 130 and the sidewall part 150 in order to trap light reflected into the camera hole 111 (or the lens 230) from the base part 130 and the sidewall part 150. In FIG. 3, a hatched portion may indicate where the light trap part 300 is installed, and will be applied in the same manner in FIGS. 4 to 7.

As described above, the light incident on the camera hole 111 may be trapped through the protrusion structure of the base part 130 and the sidewall part 150. In the present embodiment, however, light incident on the camera hole 111 may be trapped through the light trap part 300 installed on the base part 130 and the sidewall part 150, in order to remove the burden of the optical design for forming the protrusion structure.

Referring to FIG. 3, the light trap part 300 may include a fiber member which is formed on the outer surfaces of the base part 130 and the sidewall part 150 and absorbs light incident on the base part 130 and the sidewall part 150.

Specifically, the light trap part 300 may be formed of a fiber member, and brought in contact with the outer surfaces of the base part 130 and the sidewall part 150 or cover the outer surfaces of the base part 130 and the sidewall part 150. Therefore, while light incident on the base part 130 and the sidewall part 150 is absorbed by the light trap part 300 formed of a fiber member, diffuse reflection can be prevented, which makes it possible to reduce the amount of light incident on the camera hole 111. At this time, the light trap part 300 may include various fiber members for absorbing light incident on the base part 130 and the sidewall part 150. For example, the fiber member may include a black velvet material.

The light trap part 300 may further include coupling members formed on the contact surfaces with the outer surfaces of the base part 130 and the sidewall part 150. Thus, the light trap part 300 can be detached from or attached to the outer surfaces of the base part 130 and the sidewall part 150 through the coupling members.

That is, the light trap part 300 formed of a fiber member may include the coupling members formed on the contact surfaces with the outer surfaces of the base part 130 and the sidewall part 150 (i.e. the bottom surface of the light trap part 300). The coupling member may be formed of plastics. Therefore, the light trap part 300 can be easily coupled to or separated from the outer surfaces of the base part 130 and the sidewall part 150. Furthermore, guide structures may be formed on the outer surfaces of the base part 130 and the sidewall part 150, respectively, and the light trap part 300 may be detachably formed on the outer surfaces of the base part 130 and the sidewall part 150 through sliding coupling between the coupling members of the light trap part 300 and the guide structures. The coupling members may be formed of a predetermined adhesive, such that the light trap part 300 can be coupled to the outer surfaces of the base part 130 and the sidewall part 150.

The housing 100 in accordance with the present embodiment may be installed on the inner surface of the windshield of the vehicle, and the camera module 200 installed in the camera hole 111 may include a front view camera module for filming the area ahead of the vehicle outside the windshield. At this time, since the light trap part 300 is formed on the top outer surface of the housing 100, adjacent to the sidewall part 150, the light trap part 300 may absorb light incident through a gap between the windshield and the top outer surface of the housing 100, adjacent to the sidewall part 150. FIG. 4 illustrates that the light trap part 300 is formed on the top outer surface of the housing 100, adjacent to the sidewall part 150.

Specifically, the housing 100 may be installed on the inner surface of the windshield of the vehicle, and a gap may be present between the windshield and the top outer surface of the housing 100, adjacent to the sidewall part 150, due to a difference in mechanical shape therebetween. Therefore, it is necessary to reduce light incident through the gap between the windshield and the top outer surface of the housing 100, adjacent to the sidewall part 150, while reducing light reflected into the camera hole 111 from the base part 130 and the sidewall part 150 through the light trap part 300. In the present embodiment, the light trap part 300 may be formed on not only the sidewall part 150 but also the top outer surface of the housing 100, adjacent to the sidewall part 150, thereby absorbing light incident through the gap between the windshield and the top outer surface of the housing 100.

At this time, the light trap part 300 may be formed on a groove part 170 formed at the top outer surface of the housing 100, adjacent to the sidewall part 150.

Referring to FIG. 5, the housing 100 may include the groove part 170 formed at the top outer surface of the housing 100, adjacent to the sidewall part 150, such that the light trap part 300 can be formed on the groove part 170. The light trap part 300 may be formed so as to be in contact with the top outer surface of the housing 100, adjacent to the sidewall part 150, through the groove part 170. Therefore, the size of the camera apparatus for a vehicle in accordance with the present embodiment can be reduced, while no inference occurs in the FOV of the camera module 200.

At this time, the height of the groove part 170 may be adjusted in such a manner that a height difference between the upper outer surface of the housing 100 and the light trap part 300 formed on the groove part 170 falls within a preset error range. The height may indicate the height of a region of the light trap part 300, the region being adjacent to the top outer surface of the housing 100, adjacent to the sidewall part 150, as indicated by h in FIG. 5.

That is, when the light trap part 300 formed on the groove part 170 is positioned on the same plane as the top outer surface of the housing 100 adjacent to the light trap part 300, light incident through the gap between the top outer surface of the housing 100 and the windshield can be effectively absorbed. At this time, the error range may be previously designed in consideration of an actual design error, and the height of the groove part 170 may be adjusted in such a manner that the height difference between the light trap part 300 formed on the groove part 170 and the top outer surface of the housing 100 falls within the error range. Thus, while the light incident through the gap between the windshield and the top outer surface of the housing 100 is effectively absorbed, the design and implementation can be improved.

The groove part 170 may be designed to have various widths based on experiment results for effectively reducing diffuse reflection. The width may indicate the width of a region of the light trap part 300, the region being adjacent to the top outer surface of the housing 100, adjacent to the sidewall part 150, as indicated by d of FIG. 5.

In the present embodiment, it has been described that the light trap part 300 is formed so as to be in contact with the outer surfaces of the base part 130 and the sidewall part 150 and the top outer surface of the housing 100, adjacent to the sidewall part 150. In an embodiment, however, the light trap part 300 may be formed on the top outer surface of the housing 100, adjacent to the base part 130, as illustrated in FIG. 6.

That is, the reflected light incident on the camera hole 111 may include not only light reflected from the outer surfaces of the base part 130 and the sidewall part 150 and the top outer surface of the housing 100, adjacent to the sidewall part 150, but also light reflected from the top outer surface of the housing 100, adjacent to the base part 130, depending on the mechanical shape of the housing 100. Therefore, as illustrated in FIG. 6, the light trap part 300 may also be formed on the top outer surface of the housing 100, adjacent to the base part 130.

That is, a top outer surface region of the housing 100, where the light trap part 300 is to be formed, may be designed in consideration of the mechanical shapes of the windshield and the housing 100, and the light trap part 300 may be formed on the designed top outer surface region of the housing 100, which makes it possible to effectively reduce light incident on the camera hole 111 through diffuse reflection.

The structure of the camera apparatus for a vehicle in accordance with the present embodiment needs to be accurately designed, in order to prevent an occurrence of interference in the FOV of the camera module 200. Therefore, the distance between the camera hole 111 and the light trap part 300 brought in contact with the outer surface of the base part 130, the downward slope of the base part 130, and the thickness of the light trap part 300 brought in contact with the outer surface of the base part 130 may be adjusted to prevent an occurrence of interference in the FOV of the camera module 200.

Referring to FIG. 7, the structure will be described in detail. For convenience of description, the sidewall part is not illustrated in FIG. 7. The FOV of the camera module 200, at which the area ahead of the camera module 200 can be recognized, may be decided according to the lens 230. When the end of the base part 130, located at the remotest position from the camera module 200, is included in the FOV range of the camera module 200, interference may occur in the FOV of the camera module 200. Therefore, as illustrated in FIG. 7, a predetermined margin needs to be present between the end of the base part 130 and the vertical FOV of the camera module 200, and the position of the end of the base part 130 depends on the distance L between the camera hole 111 and the light trap part 300 brought in contact with the outer surface of the base part 130, the downward slope θ of the base part 130, and the thickness D of the light trap part 300 formed on the outer surface of the base part 130. Thus, the distance between the camera hole 111 and the light trap part 300 brought in contact with the outer surface of the base part 130, the downward slope of the base part 130, and the thickness of the light trap part 300 formed on the outer surface of the base part 130 may be adjusted.

The FOV (20°) of the camera module 200 and the thickness (2 mm) of the light trap part 300 in FIG. 7 are only examples for promoting understandings of the present embodiment. The FOV of the camera module 200 may have various values depending on the lens 230 (for example, 20° to 30°), the thickness of the light trap part 300 may be adjusted to various values based on the FOV of the camera module 200 (for example, 1 mm to 3 mm), and the downward slope of the base part 130 may also be adjusted to various values based on the FOV of the camera module 200 and the thickness of the light trap part 300.

FIGS. 8A to 8D show images around a vehicle, acquired through a camera apparatus in which the light trap part 300 in accordance with the present embodiment is not mounted. FIG. 8A shows a result when light reflected from the base part 130 and the sidewall part 150 is incident on the lens 230 while backlight illuminates. FIG. 8B shows that light is partially diffuse-reflected by the base part 130 and the sidewall part 150 and incident on the lens 230, while backlight illuminates, thereby blurring the image. FIG. 8C shows that glare occurs when light is incident or reflected through the gap between the windshield and the top outer surface of the housing 100, adjacent to the sidewall part 150. FIG. 8D shows that the image is blurred by diffuse reflection of light at the left and right bottoms of the recess formed in the housing 100, while backlight illuminates.

FIGS. 9A and 9B show images around the vehicle, acquired through the camera apparatus including the light trap part 300 in accordance with the present embodiment. As shown in FIGS. 9A and 9B, glare or blur caused by diffuse reflection of light can be removed even though backlight illuminates.

In the present embodiment, the camera apparatus for a vehicle can reduce light incident on the camera lens through diffuse reflection, using the light trap part formed of a fiber member. Therefore, the camera apparatus can not only remove inefficiency in terms of time, come and workability, which was accompanied during the conventional optical design, but also remove glare and blur in an image acquired through the front view camera, thereby improving the driving stability of the vehicle.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A camera apparatus for a vehicle, comprising a housing having a recess formed therein,
    wherein the housing comprises: a main wall part having a camera hole formed therein; a base part extended from the main wall part and having a downward slope in which a distance from the center axis of the camera hole to the base part increases toward the end of the base part from the main wall part; and a sidewall part adjacent to the main wall part and extended upward from the base part,
    the main wall part, the base part and the sidewall part form the recess in the housing, and
    a light trap part for trapping light reflected from the base part and the sidewall part into the camera hole is installed on the base part and the sidewall part,
    wherein the housing is installed on the inner surface of the windshield of the vehicle, and
    the light trap part is formed on the top outer surface of the housing, adjacent to the sidewall part, and thus absorbs light incident through a gap between the windshield and the top outer surface of the housing, adjacent to the sidewall part.

2. The camera apparatus of claim 1, wherein a camera module including an image recognition sensor, a lens and a camera housing is installed in the camera hole, and
    the camera module concentrates light of an image around the vehicle through the lens, and recognizes the concentrated light of the vehicle around image through the image recognition sensor, in order to take the vehicle around image.

3. The camera apparatus of claim 2, wherein the light trap part comprises a fiber member brought in contact with the outer surfaces of the base part and the sidewall part so as to absorb light incident from the base part and the sidewall part.

4. The camera apparatus of claim 3, wherein the light trap part further comprises a coupling member formed at contact surfaces with the outer surfaces of the base part and the sidewall part so as to be attached to/detached form the outer surfaces of the base part and the sidewall part.

5. The camera apparatus of claim 1, wherein the light trap part is formed on a groove part formed at the top outer surface of the housing, adjacent to the sidewall part.

6. The camera apparatus of claim 5, wherein the height of the groove part is adjusted so that a height difference between the light trap part formed on the groove part and the top outer surface of the housing falls within a preset error range.

7. The camera apparatus of claim 3, wherein a distance between the camera hole and the light trap part brought in contact with the outer surfaces of the base part is adjusted so as to prevent an occurrence of interference in a field of view (FOV) of the camera module.

8. The camera apparatus of claim 3, wherein the downward slope of the base part and the thickness of the light trap part brought in contact with the outer surfaces of the base part are adjusted so as to prevent an occurrence of interference in the FOV of the camera module.

\* \* \* \* \*